United States Patent
Vija et al.

(10) Patent No.: US 8,090,179 B2
(45) Date of Patent: Jan. 3, 2012

(54) EXTERNAL PIXON SMOOTHING FOR TOMOGRAPHIC IMAGE RECONSTRUCTION TECHNICAL FIELD

(75) Inventors: A. Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1098 days.

(21) Appl. No.: 11/931,084

(22) Filed: Oct. 31, 2007

(65) Prior Publication Data

US 2009/0110254 A1    Apr. 30, 2009

(51) Int. Cl.
*G06K 9/36* (2006.01)
*G06K 9/40* (2006.01)

(52) U.S. Cl. ........ 382/131; 382/254; 382/260; 382/264; 382/265; 382/275

(58) Field of Classification Search .................. 382/131, 382/132, 254, 275, 260–269
See application file for complete search history.

(56) References Cited

U.S. PATENT DOCUMENTS

| | | | |
|---|---|---|---|
| 5,912,993 A * | 6/1999 | Puetter et al. | 382/275 |
| 6,246,784 B1 * | 6/2001 | Summers et al. | 382/128 |
| 6,353,688 B1 * | 3/2002 | Puetter et al. | 382/265 |
| 6,674,083 B2 * | 1/2004 | Tanaka et al. | 250/363.03 |
| 7,457,655 B2 * | 11/2008 | Welch et al. | 600/407 |
| 7,558,417 B2 * | 7/2009 | Knoplioch et al. | 382/131 |
| 7,660,481 B2 * | 2/2010 | Schaap et al. | 382/266 |

OTHER PUBLICATIONS

R. C. Puetter et al., "Digital Image Reconstruction: Deblurring and Denoising," Annu. Rev. Astron. Astrophys. 2005, 43:139-194.*
Carl A. Wesolowski et al., "Improved lesion detection from spatially adaptive, minimally complex, Pixon® reconstruction of planar scintigraphic images," Computerized Medical Imaging and Graphics 29 (2005), 65-81.*
A. Hans Vija et al., "Preprocessing of SPECT Projection Data: Benefits and Pitfalls," 2005 IEEE Nuclear Science Symposium Conference Record, 2160-2164.*
R. C. Puetter, "Pixons and Bayesian image reconstruction," SPIE vol. 2302 Image Reconstruction and Restoration (1994), 112-131.*
R. C. Puetter et al., "The pixon and Bayesian image reconstruction," SPIE vol. 1946 Infrared Detectors and Instrumentation (1993), 405-416.*
R. K. Pina et al., "Bayesian Image Reconstruction: The Pixon and Optimal Image Modeling," Publication of the Astronomical Society of the Pacific 105: 630-637, Jun. 1993.*

* cited by examiner

*Primary Examiner* — Allen C. Ho
(74) *Attorney, Agent, or Firm* — Peter L. Kendall

(57) ABSTRACT

Tomographically reconstructing a 3D image object corresponding to a data set includes reconstructing a first reconstructed object from the data set, receiving a smoothing map, smoothing the first reconstructed object based on the smoothing map thereby creating a first smoothed object, and outputting the first smoothed object as the 3D image object. Smoothing a first object thereby creating a smoothed object having a smoothed value associated to each object point in object space includes receiving the first object, determining, in a series of steps, single-kernel-smoothed objects, wherein each iteration step is associated with a kernel function and includes, determining a start object based on the first object, and smoothing the start object using the kernel function of the iteration step, thereby creating the single-kernel-smoothed object having single-kernel-smoothed values associated to each object point, and constructing the smoothed object from the single-kernel-smoothed values.

25 Claims, 10 Drawing Sheets

EXTERNAL PIXON SMOOTHING FOR TOMOGRAPHIC IMAGE RECONSTRUCTION TECHNICAL FIELD

An embodiment of the invention relates to image reconstruction, and in particular, to image reconstruction using a pixon method.

BACKGROUND

An overview of different reconstruction methods including a pixon method is given in R. C. Puetter et al., "Digital Image Reconstruction: Deblurring and Denoising," Annu. Rev. Astro. Astrophys., 2005, 43: 139-194; the pixon method is described in R. C. Puetter et al., "The pixon method of image reconstruction," Astronomical Data Analysis Software and Systems VIII., edited by D. M. Mehringer, R. L,. Plante D. A. Roberts, Astronomical Society of the Pacific, San Francisco, ASP Conference Series 1999, 172, 307-316, the contents of which are herein incorporated by reference. An application of the pixon method to medical planar imaging is discussed in C. A. Wesolowski et al., "Improved lesion detection from spatially adaptive, minimally complex, pixon® reconstruction of planar scintigraphic images", Comput. Med. Imaging Graph., 2005, 29, 65-81, the contents of which are herein incorporated by reference.

SUMMARY

An embodiment of the invention is based in part on the recognition that pixon smoothing can be applied externally in tomographic reconstruction.

In an aspect, tomographically reconstructing a 3D image object corresponding to a data set includes reconstructing a first reconstructed object from the data set and determining a pixon map based on the first reconstructed object and the data set. It further includes pixon smoothing the first reconstructed object based on the pixon map thereby creating a first smoothed object and outputting the first smoothed object as the 3D image object.

In another aspect, tomographically reconstructing a 3D image object corresponding to a data set includes reconstructing a first reconstructed object from the data set, receiving a smoothing map, smoothing the first reconstructed object based on the smoothing map thereby creating a first smoothed object, and outputting the first smoothed object as the 3D image object.

In another aspect, a nuclear imaging device for providing a 3D image object includes a detector unit for detecting radiation emitted from within a patient and providing a data set indicative of the detected radiation, a tomographic reconstruction unit configured to reconstruct a first reconstructed object on the basis of the data set and to provide the first reconstructed object as an output object, a pixon smoothing unit configured to receive the first reconstructed object and to smooth the first reconstructed object based on a pixon map that assigns pixon kernel unctions to object points within a 3D object space, thereby creating a first smoothed object, an output port for providing the medical image, and a control unit for controlling which of the output object and the first smoothed object is provided at the output port as the 3D image object.

In another aspect, smoothing a first object thereby creating a smoothed object having a smoothed value associated to each object point in object space includes receiving the first object, determining, in a series of steps, single-kernel-smoothed objects, wherein each iteration step is associated with a kernel function and includes, determining a start object based on the first object, and smoothing the start object using the kernel function of the iteration step, thereby creating the single-kernel-smoothed object having single-kernel-smoothed values associated to each object point, and constructing the smoothed object from the single-kernel-smoothed values.

Implementations may include one or more of the following features. Reconstructing a 3D image object may further include determining a quality of the first smoothed object, determining that the quality of the first smoothed object remains outside a limitation of a preset threshold value, updating the pixon map based on the first smoothed object thereby creating an updated pixon map, based on the updated pixon map, pixon smoothing the first smoothed object thereby creating a second smoothed object, and outputting the second smoothed object as the 3D image object.

Pixon smoothing the first smoothed object may include determining, in a series of iteration steps, intermediate smoothed objects, wherein each iteration step includes receiving an input object, determining a smoothed object based on the input object and the pixon map, and determining a quality of the smoothed object. Pixon smoothing may further include determining that the quality of a first of the intermediate smoothed objects is inside the limitation of a preset threshold value and assigning the first of the intermediate smoothed objects as the first smoothed object. The reconstructed object may be the input object of the first iteration. The intermediate smoothed object determined in an iteration may be the input object for the next iteration.

Reconstructing a 3D image object may further include reconstructing a second reconstructed object based on the data set and the first smoothed object and outputting the second reconstructed object as the 3D image object.

Pixon smoothing the first reconstructed object may include a series of iteration steps, wherein each iteration step includes receiving a pixon kernel function, determining a smoothed value of a first object point within object space based on the pixon kernel function, and constructing the first smoothed object by using the smoothed value to determine an entry of the first smoothed object associated to the first object point.

Determining the smoothed value based on the pixon kernel function may include selecting the first object point to be an object point to which the pixon kernel function is assigned in the pixon map, determining a set of object points associated with the first object point based on the pixon kernel function, and determining the smoothed value based on the values of the object points within the set of object points.

Determining the smoothed value based on the pixon kernel function may include smoothing the first reconstructed object with the pixon kernel function thereby creating a single-kernel-forward-smoothed object, wherein the single-kernel-forward smoothed object includes as an entry the smoothed value associated to the first object point.

Smoothing the first reconstructed object may include determining for each of the object points a set of object points based on the pixon kernel function and determining a smoothed value for each object point based on the values of the data points within the set of object data points.

Smoothing the first reconstructed object may include, based on a value of the pixon map associated to the first object point, determining a smoothing contribution of the pixon kernel function to the pixon smoothed value associated to the first object point, and wherein constructing the first smoothed object may consider the smoothing contribution.

The pixon map may include a weight for a combination of pixon kernel function and object point. Constructing the first smoothed object may further include weighting the smoothed value with the weight for that combination of pixon kernel function and object point.

Determining a smoothed value of a first object point may include identifying object points of the first object that are to receive a smoothing contribution from the selected pixon kernel function as indicated in the pixon map, determining contribution factors indicative of an extent to which the selected pixon kernel function contributes to the smoothing of the selected object points, multiplying values of the object points of the first reconstructed object with corresponding contribution factors thereby creating a temporary object, and smoothing the temporary object with the pixon kernel function thereby creating a single-kernel-backward-smoothed object, wherein the single-kernel-backward-smoothed object includes as an entry the smoothed value associated to the first object point.

Constructing the first smoothed object may include adding the entries of the single-kernel-backward smoothed objects for all pixon functions indicated in the pixon map.

The first reconstructed object may be reconstructed as a 3D object. Reconstructing the first reconstructed object may include running an algorithm selected from the group consisting of algorithms based on maximum likelihood, algorithms based on an ordered subset expectation maximization, algorithms based on a non-negative least square fit, and algorithms based on an ordered subset non-negative least square fit.

Reconstructing a 3D image object may further include detecting the data set with a nuclear imaging device.

The smoothing operation may be based on smoothing selected from the group consisting of smoothing based on pixon smoothing, smoothing based on Fourier filtering, smoothing based on wavelet filtering, smoothing based on filtering with a Wiener filter, and smoothing based on filtering with a fixed filter.

The reconstruction unit of the nuclear imaging device may be further configured to receive the first smoothed object as the input object for reconstructing a second reconstructed object and to provide the second reconstructed object as the output object.

The pixon smoothing unit of the nuclear imaging device may be configured to receive the second reconstructed object and to smooth the second reconstructed object thereby creating a second smoothed object.

The detector unit may include a positron emission tomography detector system and/or a single photon computed tomography detector system and/or a computed tomography detector system.

Smoothing the first reconstructed object may includes determining, in a series of steps, single-kernel-smoothed objects, wherein each iteration step is associated with a kernel function associated to the smoothing map and includes determining a start object based on the first reconstructed object, smoothing the start object using the kernel function of the iteration step, thereby creating the single-kernel-smoothed object having single-kernel-smoothed values associated to each object point, and constructing the first smoothed object from the single-kernel-smoothed values.

The first smoothed object may be used as the start object and determining single-kernel-smoothed objects may include receiving contribution factors to the smoothing of the kernel function for each object point and constructing the smoothed object may include weighting the single-kernel-smoothed values with the contribution factors.

Determining single-kernel-smoothed objects may include, for example, from the smoothing map, receiving contribution factors to the smoothing of the kernel function for each object point and determining the start object may include weighting the values of the first object with the contribution factors.

Determining single-kernel-smoothed objects may include receiving the kernel function from a set of pixon kernel functions and the contribution factors from a pixon map.

These general and specific aspects may be implemented using a system, a method, a computer readable medium, or a computer program, or any combination of systems, methods, a computer readable medium, or a computer programs.

Certain implementations may have one or more of the following advantages. Pixon smoothing can be externally applied to further smooth a reconstructed image based on the statistics of the data set.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
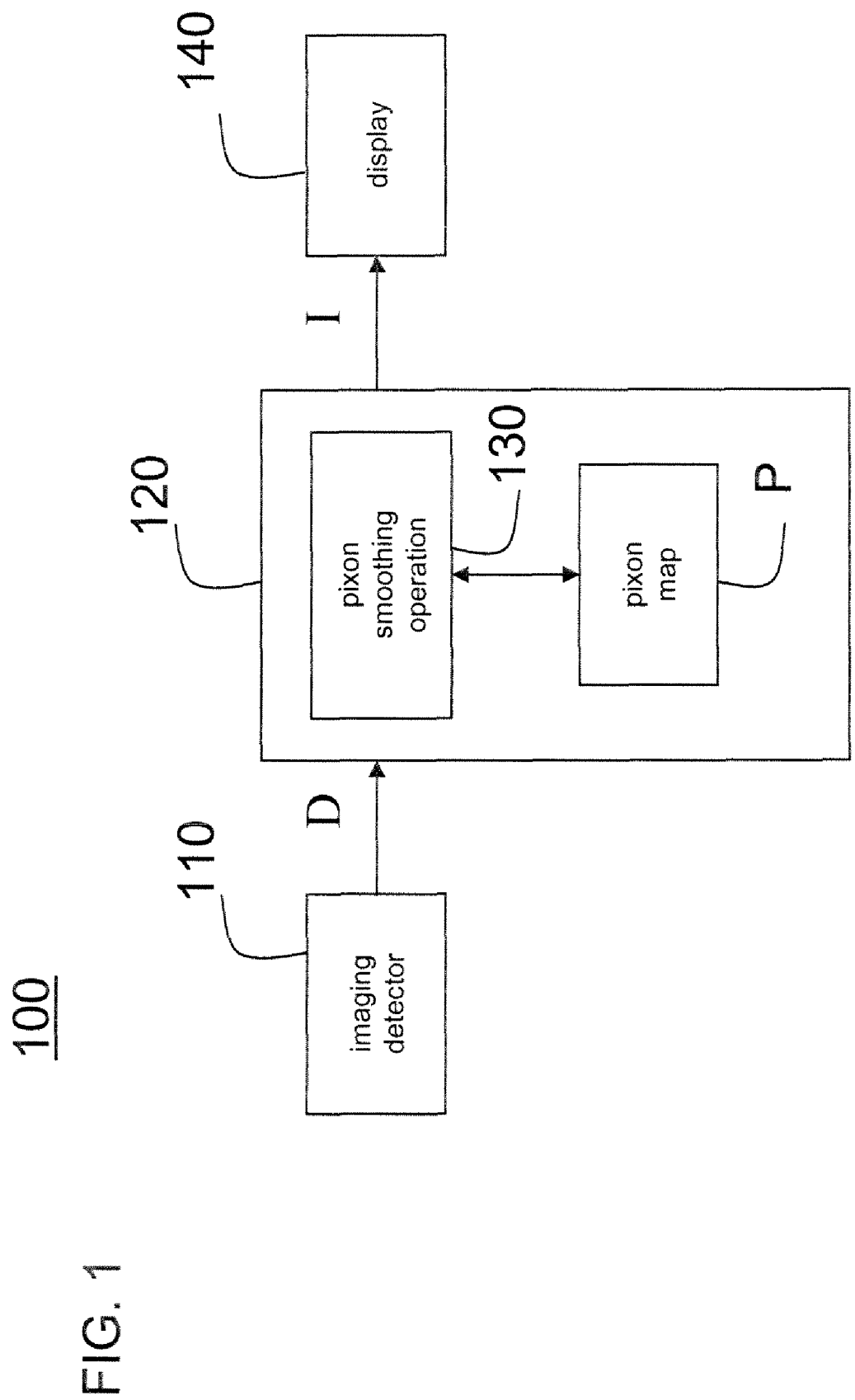
FIG. 1 is an overview of a nuclear imaging system.

FIG. 1 shows a nuclear imaging system 100 for tomography with an imaging detector 110, and a pixon reconstruction unit 120 using a 3D pixon smoothing operation 130 that interacts with a pixon map P. The pixon smoothing operation 130 is based on a pixon method. The pixon method refers to a method that smoothes an object at each point in object space (hereafter an "object point") by considering an assigned shape or volume for the smoothing. The object space is the space in which the result of the image reconstruction is defined and which corresponds to the 3D volume that was imaged using the nuclear imaging system 100. A data space is given by the data points measured with the imaging detector 110.

Within this application "pixon" is used to indicate that a term, method, object etc. refers to the pixon method, and the use of variably shaped volumes when smoothing an image object. For example, the assigned shapes are defined by pixon kernel functions, and a pixon map P stores the information about which of the pixon kernel functions is assigned to which of the object points.

The pixon method provides a smoothed image object I in object space that is a reconstruction of a data set D measured in data space and that fulfills statistical conditions of the data set D. The 3D reconstruction in the pixon reconstruction unit 120 includes external pixon smoothing a reconstructed image, by, for example, executing a sequence of reconstructing and smoothing operations. The pixon smoothing operation 130 uses the pixon map P.

The pixon smoothing operation 130 is spatially adaptive, i.e., the pixon smoothing operation 130 depends on the measured data for every object point. To every object point, one assigns a pixon kernel function, which is the basis for the pixon smoothing operation 130. Within the pixon reconstruction unit 120, the pixon map P defines which of the pixon kernel functions is assigned to each of the object points.

The pixon method is especially suited for reconstructing an object from a measured data set with a low number of counts and an unavoidable noise contribution. Such data sets are produced, for example, with medical imaging techniques in nuclear medicine, which produce 3D images of, for example, a functional process in a patient's body by using nuclear properties of matter. Examples of such imaging techniques are Positron Emission Tomography (PET) and Single Photon Emission Computed Tomography (SPECT). For these types of nuclear imaging, one administers a radioactive substance to the patient and detects emitted radiation with a detector system, e.g., with a ring detector for PET or with one or several gamma cameras for SPECT.

Referring to FIG. 1, the imaging detector 110 of the nuclear imaging system 100 detects the γ-radiation emitted from the patient. Therefore, it is positioned around or partly around the patient and could be a conventional SPECT or PET detector system. The imaging detector 110 provides the data set D to the pixon reconstruction unit 120, which uses, for example, a system matrix H to describe the properties of the nuclear imaging system 100, and an iteratively improved data model to calculate a 3D image object I on the basis of the data set D and the pixon map P. The 3D image object I can then be displayed on a display 140 using well-known volume rendering techniques.

Pixon Map Determination

The pixon method includes a search for the broadest possible pixon kernel functions that define the largest shape for the smoothing operation at each object point and that together provide an adequate fit of an object, e.g. the 3D image object I, to the data set D. The pixon kernel functions are determined on the basis of a minimum complexity approach and are used within the pixon smoothing operation 130. An exemplary determination of a pixon map P for the case of low count data having a Poisson like statistics is described in U.S. Pat. No. 8,014,580, entitled "Determining a pixon map for image reconstruction," by A. Yahil and H. Vija, of even date herewith, the contents of which are herein incorporated by reference. The information about the selected pixon kernel functions is stored in the pixon map P, which assigns to each object point its pixon kernel function.

Reconstruction Algorithm

Iterative image reconstruction methods, such as non-negative least square or Poisson-likelihood algorithms, iteratively fit image models to measured data and thus minimize the effect of noise on the image. The result of a reconstruction algorithm is an approximated image that is fit to the measured data set D according to the rules of the algorithm. Within the pixon reconstruction unit 120, this approximated image can be used as an input object for the pixon smoothing operation 130.

The pixon reconstruction unit 120 represents an image reconstructing approach that uses an image reconstruction algorithm and a pixon smoothing operation together to fit a data model, corresponding to the 3D image object, to the measured data set D. Several examples of applying pixon smoothing operations are described with reference to FIGS. 2 to 9.

Pixon Smoothing

Pixon smoothing can be viewed as averaging values of an object over a specific volume defined by the pixon kernel function. The smoothing operation can be written as a matrix operation using a pixon kernel operator K, such that the (smoothed) image object I is given by applying the pixon kernel operator K to a pseudo-image object $\psi'$:

$$I_\alpha = \sum_\beta K_{\alpha\beta} \psi'_\beta$$

"Pseudo" indicates that the smoothing operation can be understood as a transformation (using the pixon kernel operator K) from a (pseudo-)object space, i.e. the pre-Pixon smoothing space, to the object space of the 3D image object I. Applying the transpose operator of the pixon kernel operator, $K^T$, then projects from the object space back into the pseudo-object space.

In many cases, the smoothing operation is a convolution operation given by:

$$I_\alpha = \sum_\beta K_{\alpha-\beta} \psi'_\beta$$

Convolutions can be calculated, for example, by a direct summation for small pixon kernel functions and by fast Fourier transforms (FFTs) for large kernel functions. If the kernel function can be factorized, a product of operators can be applied to simplify the calculation.

Kernel functions can be discrete or continuous. They are defined over a volume that surrounds an object point. The volume can be limited (over one or more object points) or extend over the complete object space. Examples for 3D pixon kernel functions include a Gaussian function, an inverted paraboloid, or a function $f(x;\beta)=(1+\beta x^2)^{-1/\beta^2}$, which approximates the Gaussian and parabolic functions for β-values of zero or infinity, wherein the parameter x can represent the radius or depend on the direction.

The shapes of the kernel functions can be symmetric, or they can be adjusted in response to a form prevailing in the image object I. Within the shape of the pixon kernel functions, one can weigh the contribution of an object point. A limiting case of a pixon kernel function is the delta-function, in which the pixon smoothed object and the unsmoothed object are identical.

External Pixon Smoothing

Figure 2:
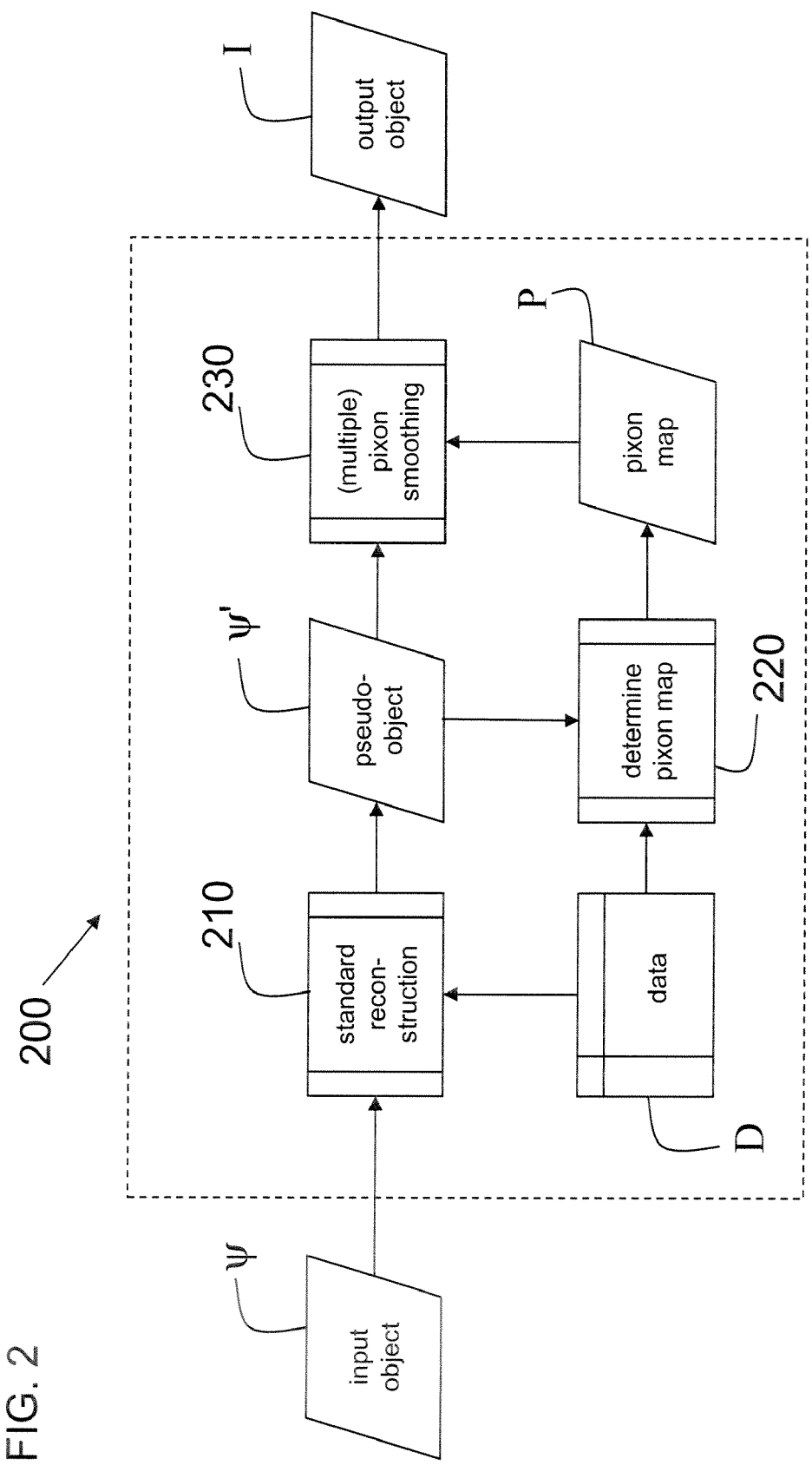
FIG. 2 is a flowchart illustrating pixon smoothing applied after image reconstruction (post-smoothing).

FIG. 2 illustrates external pixon smoothing (200). Using a standard reconstruction algorithm, an input object .phi. is fitted to the imaging data D (step 210). Examples of a reconstruction algorithm include algorithms based on maximum likelihood, based on a penalty function, algorithms based on an ordered subset expectation maximization, algorithms based on a non-negative least square fit, and algorithms based on an ordered subset non-negative least square fit. Details of an algorithm based on a non-negative least square fit are disclosed in the co-pending U.S. Published Patent Application No. 20080270465, entitled "NNLS image reconstruction," by A. Yahil and H. Vija, filed on even date herewith, the contents of which are herein incorporated by reference. In addition the merit function of a reconstruction algorithm can include a penalty function. Examples of a penalty function include a linear (Tikhonov) penalty function, a total variation penalty function, or a penalty function based on maximum entropy or Markov random fields (Gibbs priors).

In accordance with the above discussed use of the pixon kernel operator K, the resulting estimate of the 3D object is called a pseudo-object $\psi'$. One then determines a pixon map P using the pseudo-object $\psi'$ and the data set D (step 220). The pseudo-object $\psi'$ is also the initial object for the pixon smoothing operation (step 230), which will be described in more detail in connection with FIGS. 3 and 4. During the pixon smoothing operation (step 230), one repetitively smoothes each object point of the pseudo-object $\psi'$ over a pixon kernel function assigned by the pixon map P to reach a required quality of the 3D image object I.

Figure 3:
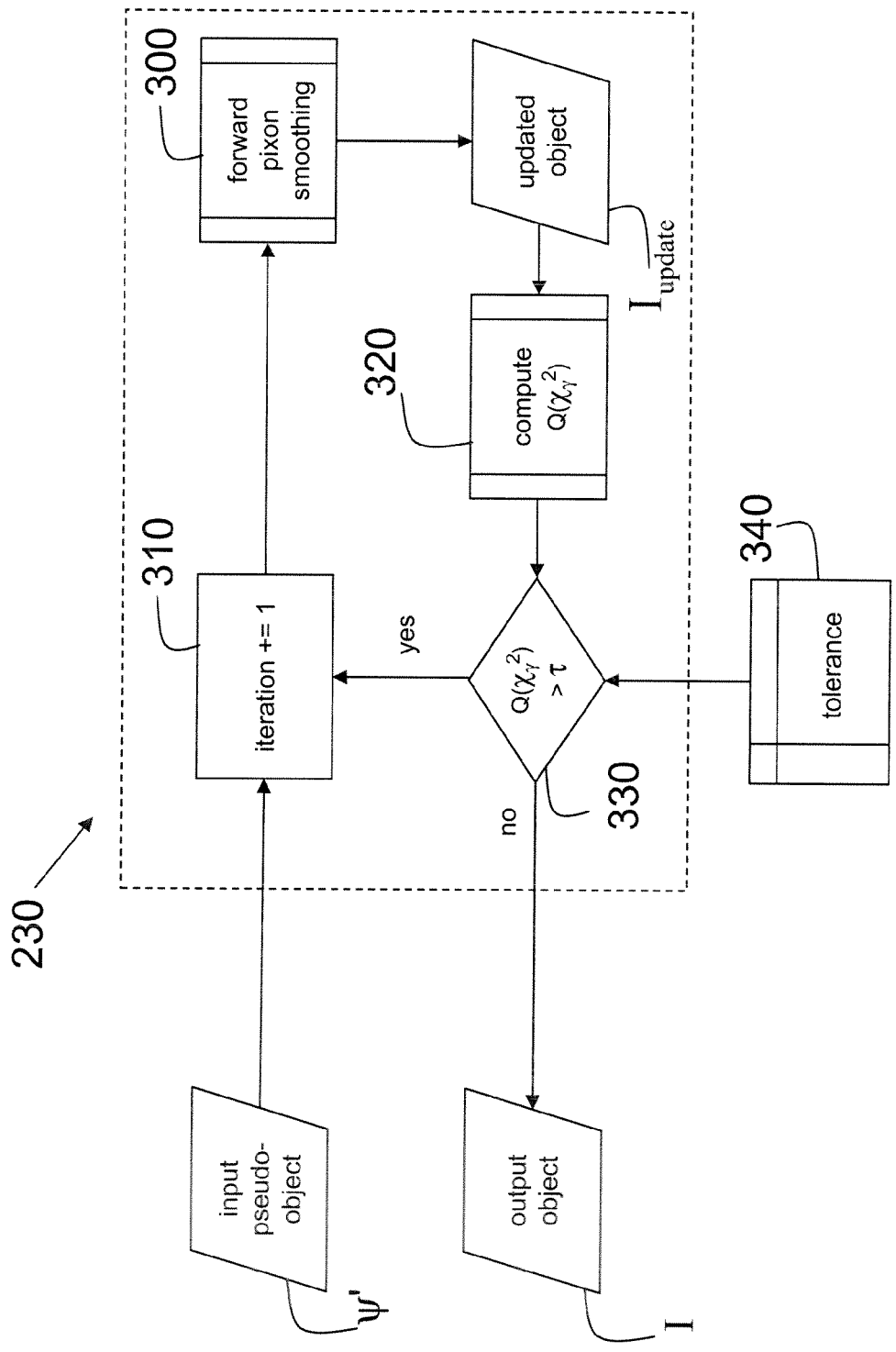
FIG. 3 is a flowchart illustrating a first example of a pixon smoothing.

FIG. 3 shows the details associated with the pixon smoothing operation (step 230). The pseudo-object $\psi'$ is smoothed using a pixon forward smoothing operation (step 300), which results in an updated object $I_{update}$. An iterative cycle is indicated by increasing an increment, iteration (step 310). The number of iterations can be preset or manually assigned. Alternatively, as shown in FIG. 3, the number of iterations can be adaptively chosen by calculating a stop-criterion, $Q(\chi_\gamma^2)$, after completing an iteration step, and determining whether a data model corresponding to the updated object $I_{update}$ fulfills a preset condition (step 330).

One such condition is a comparison of the stop-criterion, $Q(\chi_\gamma^2)$, with a threshold, $\tau$, which is stored a the tolerance table 340. Thus, in such a goodness-of-fit evaluation of the updated object $I_{update}$, the quality of the pixon smoothed image can be used to end the iteration. Examples for a quality-controlled iterative reconstruction are given in co-pending U.S. Published Patent Application No. 20090112530, entitled "Controlling the number of iterations in image reconstruction," by A. Yahil and H. Vija of even date herewith, the contents of which are herein incorporated by reference.

Forward Pixon Smoothing Operation

Figure 4:
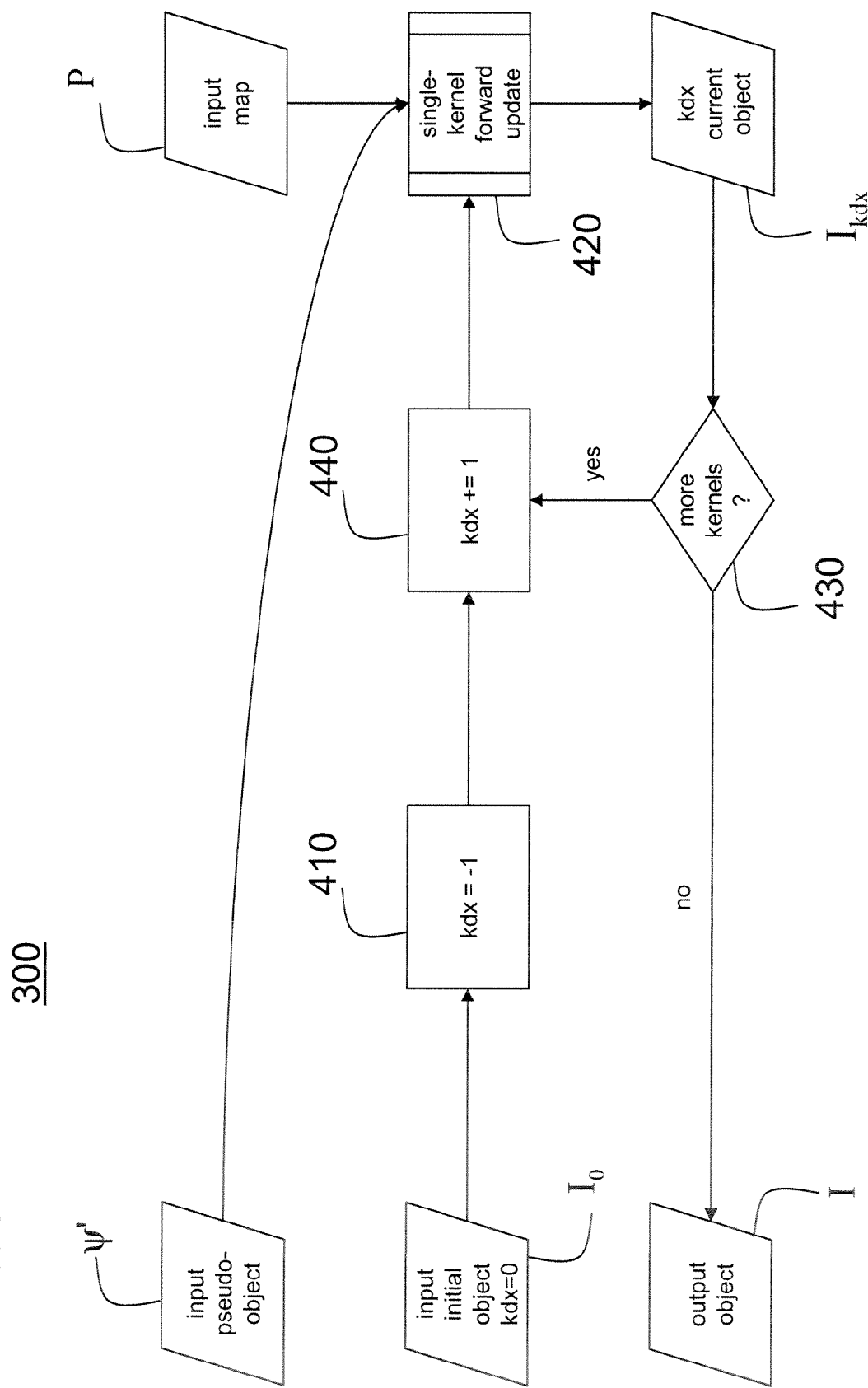
FIG. 4 is a flowchart illustrating an example of a forward pixon smoothing operation.

FIG. 4 shows the details associated with the pixon forward smoothing operation (step 300) of the pseudo-object $\psi'$. Using the pixon map P, one builds a smoothed image by smoothing each object point with the pixon kernel function that is assigned to the object point in the pixon map P. For composing the smoothed image, one smoothes the pseudo-object $\psi'$ by iteratively considering each of the provided pixon kernel functions. Thus, each object point is smoothed with its corresponding pixon kernel function as indicated in the pixon map P. For the first step, an initial image object I0, with the dimension of the image object and only data points with value zero, and a kernel pointer kdx (identifying the kernel function) are prepared (step 410) and provided to a single-kernel function forward update (step 420).

The pseudo-object $\psi'$ and the pixon map P are also input parameters to the single-kernel forward update (step 420). Output parameters of the single-kernel forward update (step 420) are the unchanged kernel pointer kdx and an updated image object $I_{kdx}$. At the end of each iteration, one determines whether another pixon kernel function update is necessary (step 430), in which case the kernel pointer kdx needs to be increased (step 440), or whether all kernel functions have been considered, in which case one assigns the updated image object $I_{kdx}$ to be the final 3D image object I.

Figure 5:
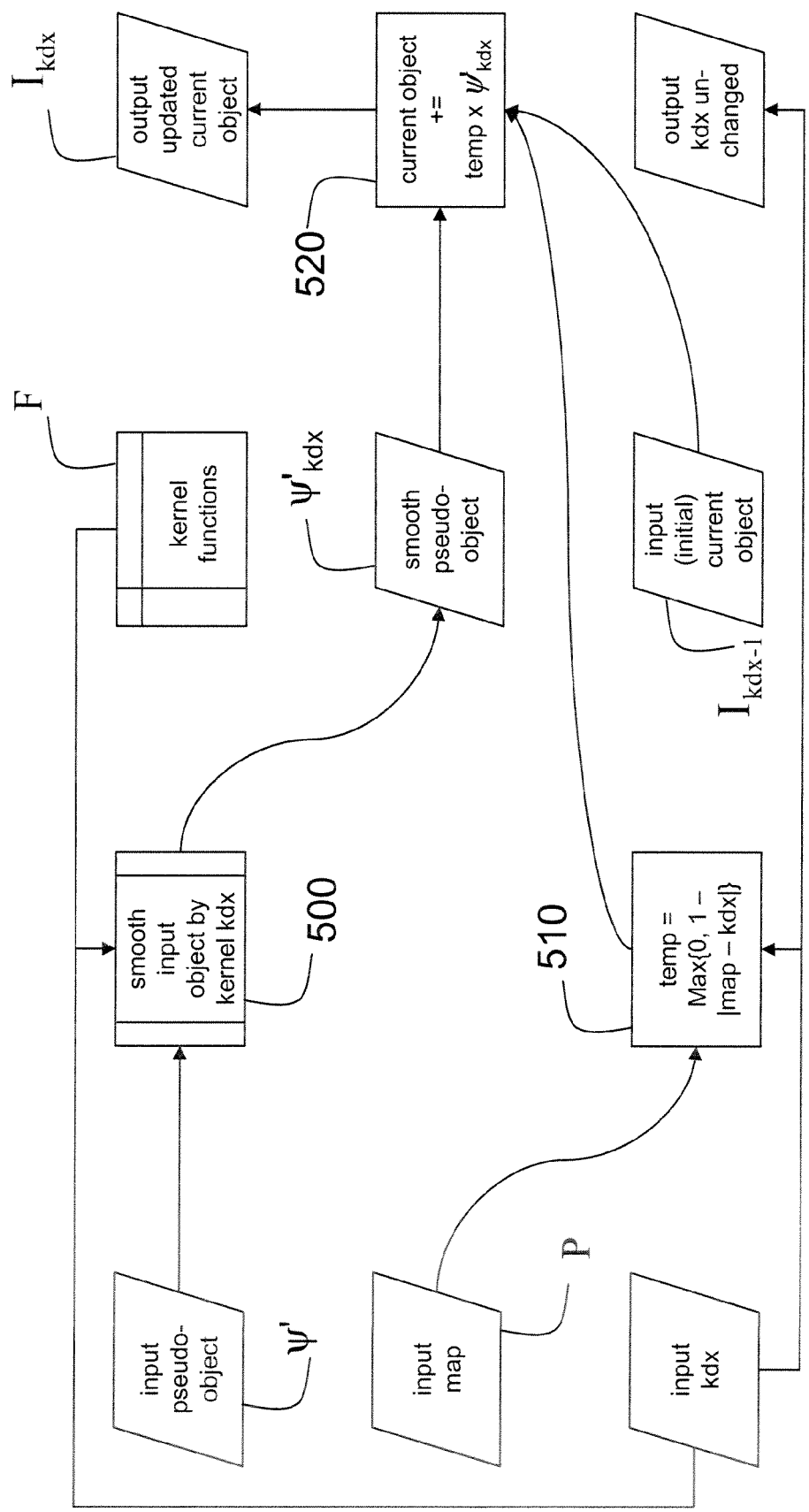
FIG. 5 is a flowchart illustrating a single-kernel function forward update of the forward pixon smoothing operation.

FIG. 5 shows, in detail, the steps in the single-kernel function update (step 420) of an image object $I_{kdx-1}$ as discussed in connection with FIG. 4. The image object $I_{kdx-1}$ comprises smoothed values for all object points, for which the pixon map P indicated smoothing with pixon kernel functions identified by kernel pointers smaller than the current kernel pointer kdx. The pseudo-object $\psi'$ is smoothed with the kernel function indicated by the current kernel pointer kdx (step 500). The result is a smoothed pseudo-object $\psi'_{kdx}$.

Then, one determines how much a data point is affected by the current kernel function (step 510). The corresponding calculation uses the pixon map P and the current value of the kernel pointer kdx to determine a temporary field, temp, which is zero if the object point is not affected. The temporary field, temp, has values between 0 and 1 when two kernel functions are used for smoothing of the object point, and a value of 1 when only the current pixon kernel function is used for smoothing of the object point. For updating each affected object point of the image object $I_{kdx-1}$, one adds, to the current value of the image object $I_{kdx-1}$, the product of the values of the temporary field, temp, and of the smoothed pseudo-object $\psi'_{kdx}$ of that object point (step 520). The result is the updated image object $I_{kdx}$.

There exist a variety of ways to apply pixon smoothing externally to 3D reconstruction algorithms. Single or multiple pixon smoothing can be followed by standard reconstruction using the pixon smoothed object as an initial object for the reconstruction (see FIG. 6). As shown in FIG. 3, the pixon smoothing can be applied multiple times until the quality of a corresponding data model fulfills a stop-criterion characterizing the goodness-of-fit of a current data model. Additionally, or as an alternative to the pixon forward smoothing with the operator K, a backward pixon smoothing can be used to generate the object with a transposed pixon operator $K^T$ (see FIGS. 8 and 9).

For many pixon smoothing operations, the pixon map P defines which of the pixon kernel functions are applied to an object point. The result of applying external pixon smoothing within tomographic reconstruction is an output object I, which is a reconstructed object that fulfills the additional constraints imposed by the pixon method.

Intermediate Pixon Smoothing

Figure 6:
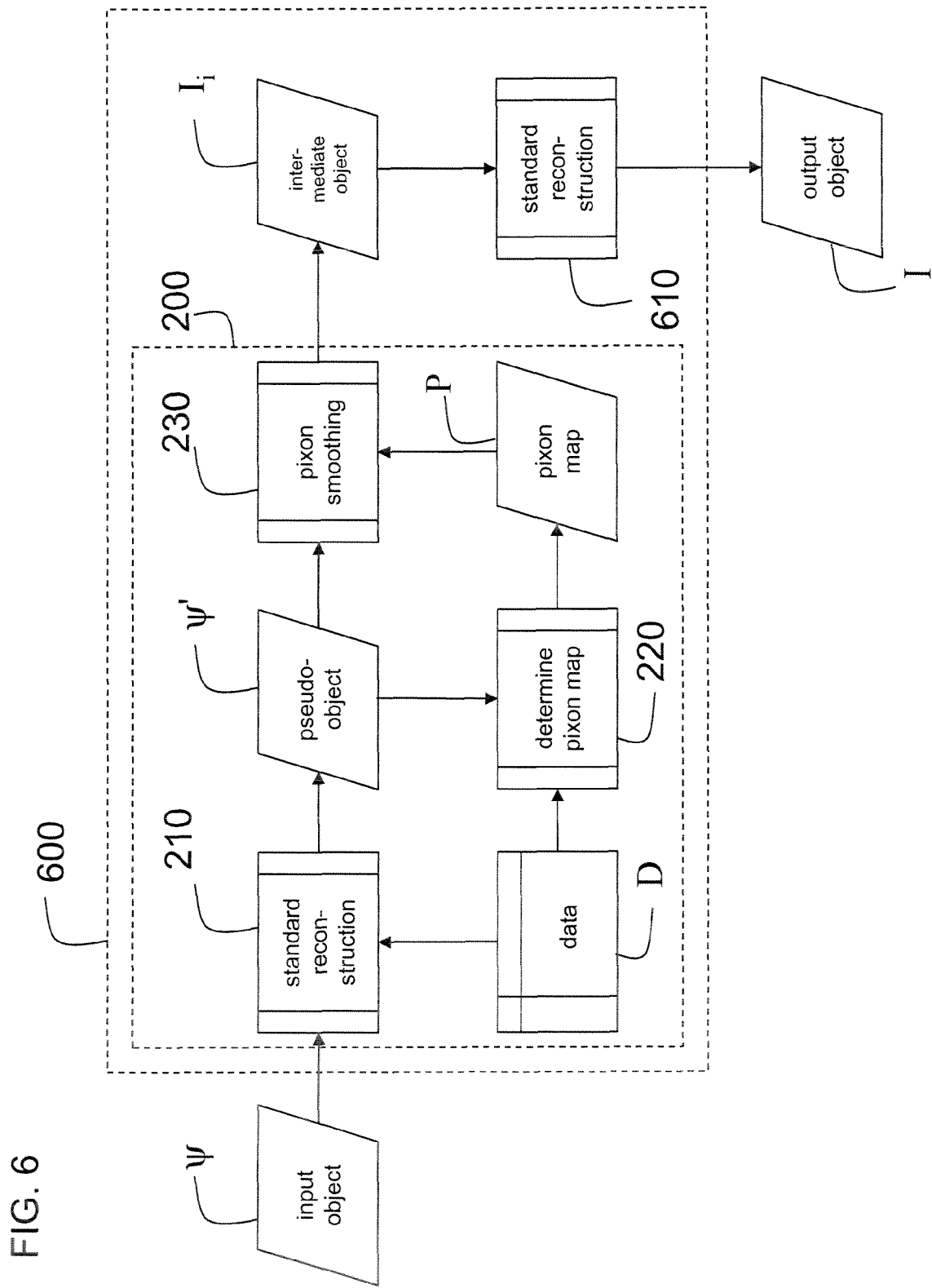
FIG. 6 is a flowchart illustrating pixon smoothing between two image reconstruction processes (intermediate smoothing).
Figure 7:
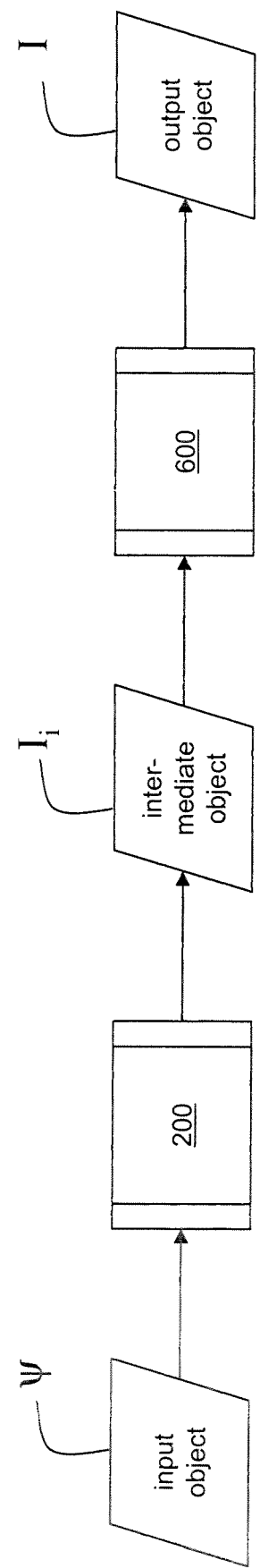
FIG. 7 is a flowchart illustrating a combination of post- and intermediate pixon smoothing.

FIG. 6 shows a schematic flow chart of intermediate pixon smoothing (step 600). An input object $\psi$ is smoothed using external pixon smoothing (step 200) to create an intermediate pixon smoothed object $I_i$. The intermediate object $I_i$ is an input object for a second standard reconstruction process (step 610), which produces the final 3D image object I. The reconstruction process (step 610) can be of the same or of different type than the standard reconstruction process (step 210). If the first reconstruction process is handling the larger part of the reconstruction, the second reconstruction process resembles a final adjustment of the pixon smoothed intermediate object $I_i$. Conversely, if the second reconstruction process handles the larger part of the reconstruction, the external pixon smoothing (step 230) can be considered as a preparation of a well-suited input object.

When pixon smoothing and reconstruction alternate, each standard reconstruction can be accompanied by a determination of an updated pixon map. Thus, the pixon smoothing is always based on the most recent estimate of the object.

Various combinations of the pixon methods described in FIGS. 2 to 6 can be employed. An example of a combination of post-smoothing and intermediate smoothing is given in FIG. 7, in which an input object $\psi$ is first smoothed using (multiple) post-smoothing (step 200). This results in an intermediate object $I_i$, which becomes an input object for the pixon intermediate smoothing (step 600) that creates the final 3D image object I.

Backward Pixon Smoothing Operation

Figure 8:
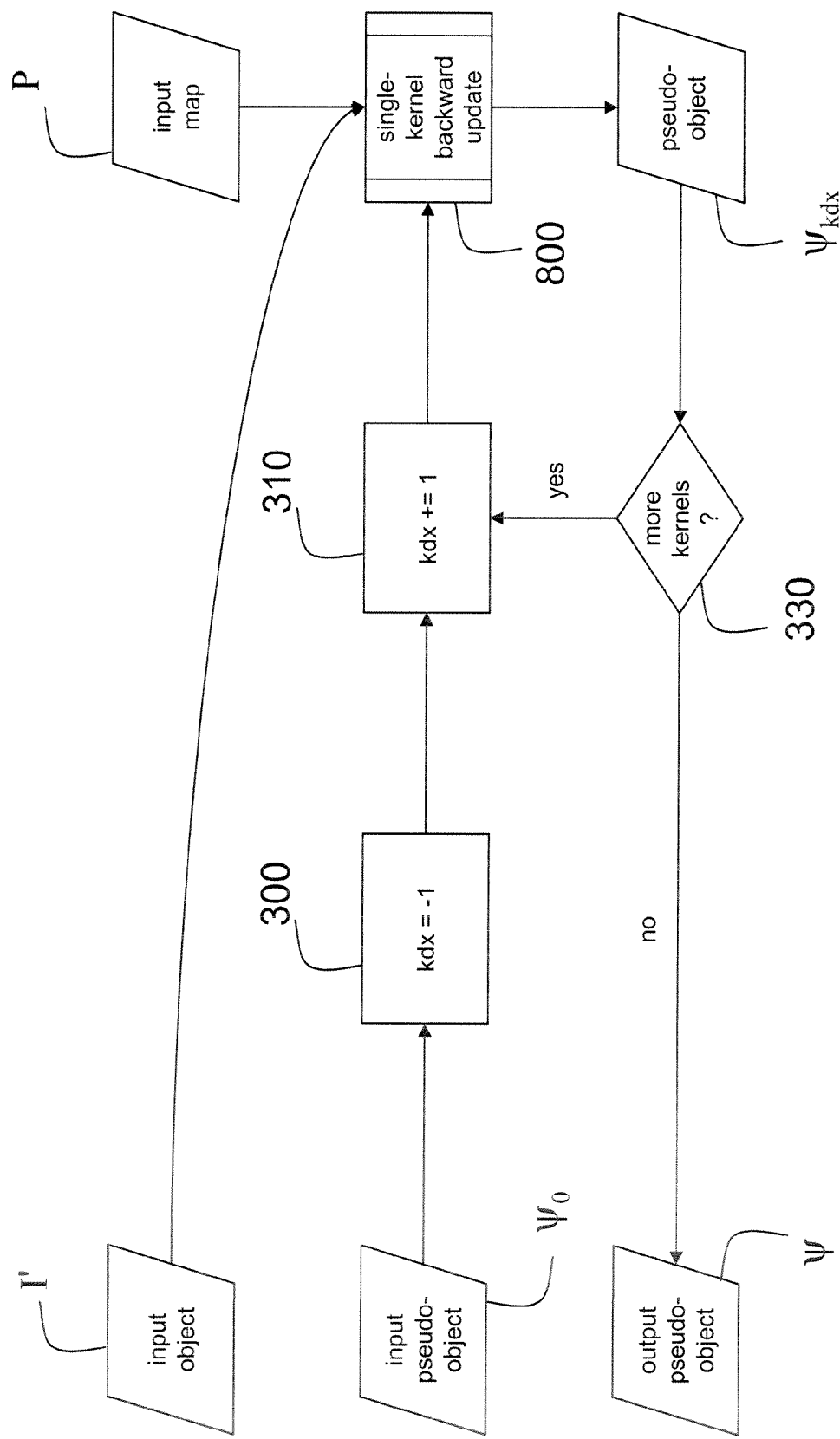
FIG. 8 is a flowchart illustrating an example of a backward pixon smoothing operation.

FIG. 8 shows a backward pixon smoothing operation, which is similar to the forward pixon smoothing of FIG. 3. However, unlike the forward pixon smoothing operation, the backward pixon smoothing operation applies the transpose pixon Kernel $K^T$ within the single kernel backward update (step 800) instead of the pixon Kernel K within the single kernel forward update (step 320 of FIG. 3). For the smoothing operation, one prepares the initial pseudo-object $\psi_o$ and the kernel pointer kdx, which indicates which one of the pixon kernel functions is applied during the single-kernel backward update. An input object I' and the pixon map P are also used within the update to determine an updated pseudo-object $\psi_{kdx}$. One then evaluates whether to include further kernel function in the smoothing or whether all kernel functions have been considered, in which case the pseudo-object $\psi_{kdx}$ becomes the final pseudo-object $\psi$.

Figure 9:
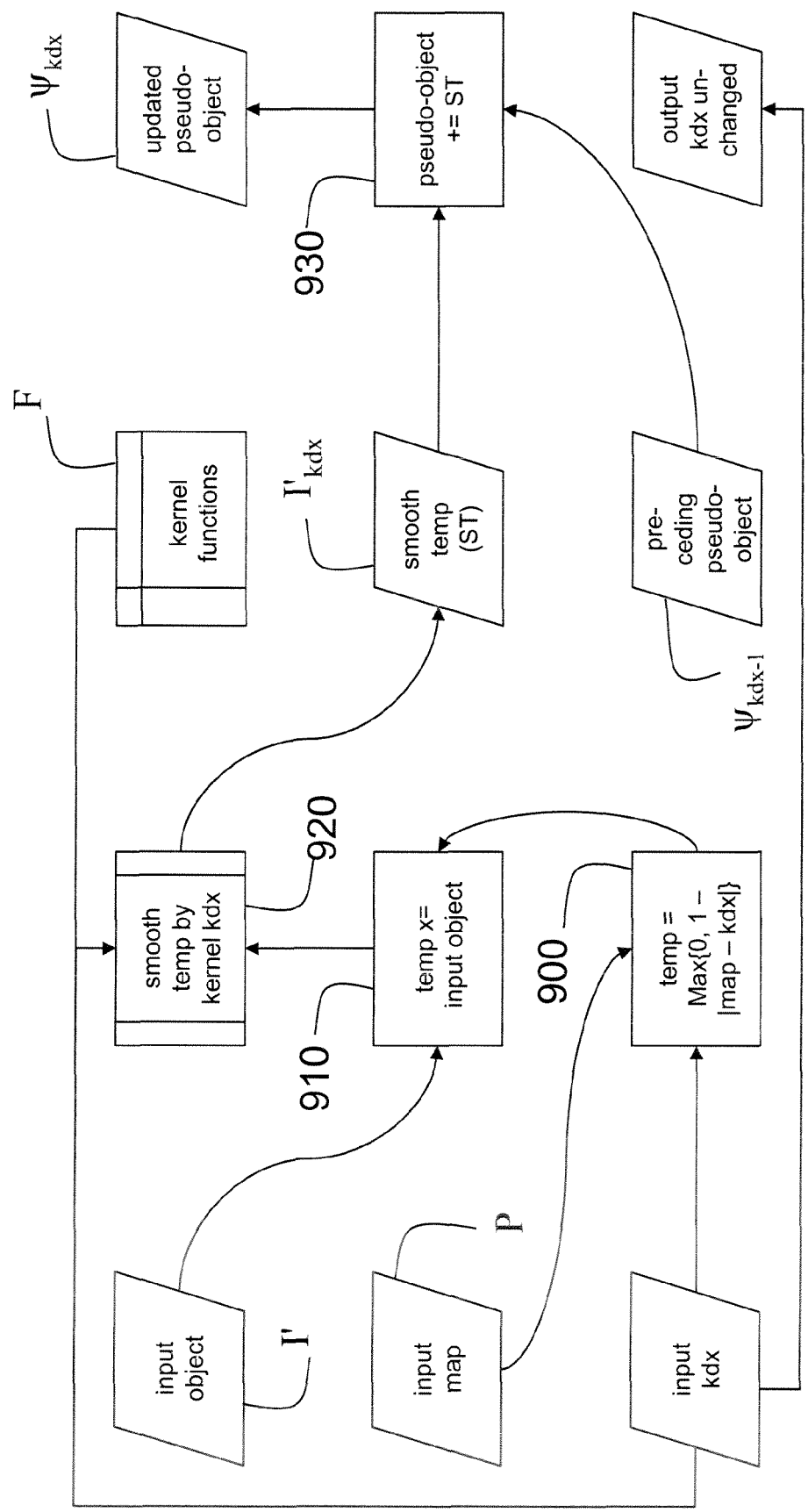
FIG. 9 is a flowchart illustrating a single-kernel function backward update of the backward pixon smoothing operation.

In FIG. 9, a single-kernel backward update implements an application of a transposed pixon Kernel $K^T$. In this case, one begins the procedure by selecting those data points of an input object I', the smoothed values of which have contributions of the smoothing with a specific pixon kernel function. Specifically, one calculates the entries of a temporary field, temp, by taking the maximum of zero or the difference between one and the modulus of the difference between the corresponding entry of the pixon map P and the value of the kernel pointer kdx (step 900). Then, one updates the temporary field, temp, by multiplying the temporary field, temp, with the input image I' (step 910). The updated temporary field, temp, contains only non-zero entries for those data points that are to be updated with the specific kernel function. The updated temporary field, temp, is then smoothed over a pixon kernel function (step 920), which is read from a field F of pixon kernel functions using the kernel counter kdx. The result is a smoothed object $I'_{kdx}$. As every data point of the updated temporary field, temp, is smoothed over the pixon kernel function, the number of data points of the smoothed object $I'_{kdx}$ with non-zero values is in most cases larger than the number of non-zero data points of the updated temporary field, temp. Finally, the updated pseudo-object $\psi_{kdx}$ is created by adding the smoothed object $I'_{kdx}$ to the preceding pseudo-object $\psi_{kdx-1}$ (step 930).

Modular Reconstruction System

Figure 10:
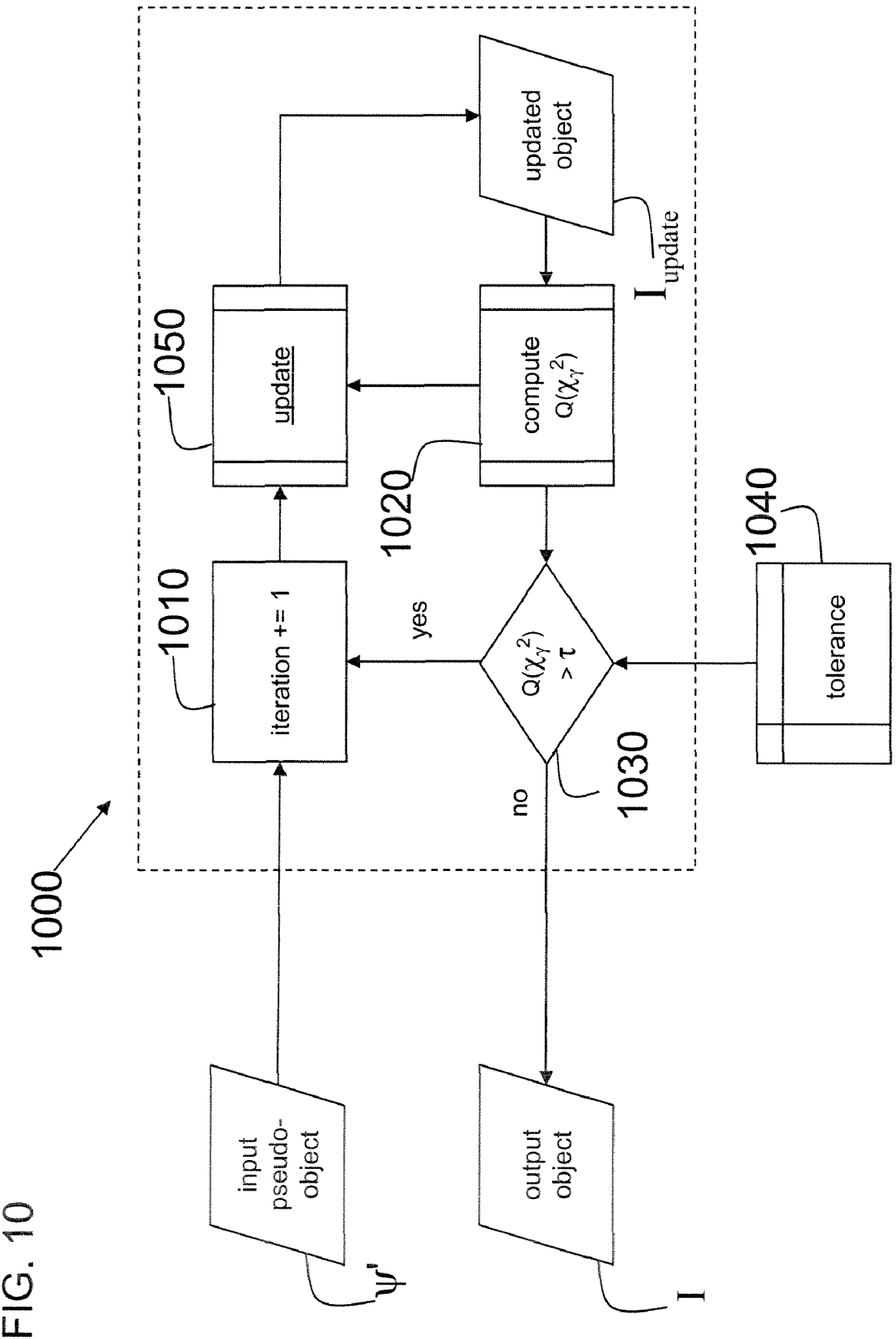
FIG. 10 is a flowchart illustrating a general concept of a modular reconstruction system.

FIG. 10 shows the details of a general concept of a modular reconstruction system. Specific examples were described with respect to FIGS. 2 to 9. In general, the pseudo-object $\psi'$ is updated using an iterative algorithm (1000), which results in an output object I. An iterative cycle is indicated by increasing an increment, iteration (step 1010). The number of iterations can be preset or manually assigned. Alternatively, as in FIG. 3, a stop-criterion, $Q(\chi_\gamma^2)$, can be calculated (step 1020) after completing an iteration step. In that case, a quality evaluation (step 1030) determines whether a data model corresponding to an updated object $I_{update}$ of each iteration fulfills a preset condition. For example, one can compare whether a stop-criterion that characterizes the quality with a threshold, $\tau$, which is stored in the tolerance table 340.

In the iterative algorithm (1000), one determines the updated object $I_{update}$ for an input object using an update operation (step 1050). The update operation is based on a set of modular operations that include conventional image reconstruction and pixon smoothing. The Pixon smoothing can include its own construction of a pixon map or it can use a previously constructed pixon map. A control mechanism defines the order in which the iterative algorithm applies the modular update operations. The control mechanism can be controlled manually by a user. In addition, or alternatively an automated system can be used that is based, for example, on the quality of the reconstructed image, or the quality of a constructed pixon map. This is, for example, indicated in FIG. 10 by the arrow pointing from the determination of the stop-criterion, $Q(\chi_\gamma^2)$ (step 1020) to the update operation (step 1050). The update operation interacts with evaluation operations like the one based on a stop-criterion as described in connection with FIG. 3.

An examplary series of steps includes a first pixon map construction, followed by a first set of pixon smoothing operations, an iterative image reconstruction with a predefined number of iterations, a second pixon map construction (or an update of the first pixon map), followed by a second set of external pixon smoothing operations. An initial reconstruction can be used to provide an initial pseudo-object to the first pixon smoothing operation.

A number of embodiments have been described. Nevertheless, it will be understood that various modifications may be made without departing from the spirit of the invention. For example, Pixon smoothing can supplement tomographic reconstruction in different technological fields, such as astronomy, communication technology, materials science and medical imaging for 3D (image) reconstruction. Thus, a pixon map construction and the smoothing operation can be based on data sets measured in these technology fields.

Examples of reconstruction algorithms include iterative image reconstruction methods, such as non-negative least square or Poisson likelihood algorithms, which iteratively fit image models to the data. An overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference.

The order in which the different pixon kernel functions are used during the smoothing operation can be varied, the step size can be varied, or some pixon kernel functions may be considered only in defined areas of the image.

The table F of pixon kernel functions may comprise, for example, ten spherical kernel functions. If one does not want to impose symmetry, one may use additionally or alternatively elliptical pixon kernel functions. However, asymmetric kernel functions may increase the computational effort, which one can handle, for example, by using specifically designed hardware.

The pixon map P can be provided, for example, as a field of variables defining the pixon kernel functions or as a field of indices, which indicate kernel functions within the table F of the pixon kernel functions.

Various combinations of external pixon smoothing described referring to FIGS. 2 to 10 can be employed. The pixon smoothing operation may be the calculation of an average of the values of the object points within the volume defined by the corresponding pixon kernel function. The number of iterations can be controlled based on a quality analysis of current objects as shown in FIG. 3. Alternatively, a predefined number of iterations assigned by a user or the system configurations can be done.

Moreover, the smoothing is not restricted to the specific use of a pixon map based on pixon kernel functions to constrain the reconstruction. Instead of a pixon smoothing operation, one could externally apply constraining operations that are based on Fourier filtering, application of a Wiener filter, wavelet filtering and/or application of a fixed filter. For such a constraining operation, the associated filter functions can be stored in a constraining map corresponding to the pixon map. An overview of different smoothing methods is given in R. C. Puetter et al., "Digital Image Reconstruction: Deblurring and Denoising," Annu. Rev. Astro. Astrophys., 2005, 43: 139-194. Furthermore, the forward and backward smoothing described in connection with FIGS. 4, 5, 8, and 9 represents an independent concept, which one may use for implementing constraining operations based on such a constraining map.

Instead of being supplied to a renderer for visualization, the output object can be supplied to a record keeping system (e.g., PACS system) or a system for automatic quantitative diagnosing.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A method for tomographic reconstruction of a 3D image object corresponding to a data set, the method comprising:
   reconstructing, by a processor, a first tomographic reconstructed object from the data set, the data set being for an imaged volume;
   determining, by the processor, a pixon map based on the first tomographic reconstructed object and the data set;
   based on the pixon map, 3D pixon smoothing, by the processor, the first tomographic reconstructed object thereby creating a first smoothed object; and
   outputting the first smoothed object as the 3D image object.

2. The method of claim 1, further comprising:
   determining a quality of the first smoothed object;
   determining that the quality of the first smoothed object remains outside a limitation of a preset threshold value;
   updating the pixon map based on the first smoothed object thereby creating an updated pixon map;
   based on the updated pixon map, pixon smoothing the first smoothed object thereby creating a second smoothed object; and
   outputting the second smoothed object as the 3D image object.

3. The method of claim 1, wherein pixon smoothing the first smoothed object includes:
   determining, in a series of iteration steps, intermediate smoothed objects, wherein each iteration step includes receiving an input object, determining a smoothed object based on the input object and the pixon map, and determining a quality of the smoothed object;
   determining that the quality of a first of the intermediate smoothed objects is inside the limitation of a preset threshold value; and
   assigning the first of the intermediate smoothed objects as the first smoothed object.

4. The method of claim 3, wherein the first tomographic reconstructed object is the input object of the first iteration, and wherein the intermediate smoothed object determined in the iteration is the input object for the next iteration.

5. The method of claim 1, further comprising:
   reconstructing a second tomographic reconstructed object based on the data set and the first smoothed object; and
   outputting the second tomographic reconstructed object as the 3D image object.

6. The method of claim 1, wherein pixon smoothing the first tomographic reconstructed object includes a series of iteration steps, wherein each iteration step includes:
   receiving a pixon kernel function;
   determining a smoothed value of a first object point within object space based on the pixon kernel function; and
   constructing the first smoothed object by using the smoothed value to determine an entry of the first smoothed object associated to the first object point.

7. The method of claim 6, wherein determining the smoothed value based on the pixon kernel function includes:
   selecting the first object point to be an object point to which the pixon kernel function is assigned in the pixon map;
   based on the pixon kernel function, determining a set of object points associated with the first object point; and
   determining the smoothed value based on the values of the object points within the set of object points.

8. The method of claim 6, wherein determining the smoothed value based on the pixon kernel function includes:
   smoothing the first tomographic reconstructed object with the pixon kernel function thereby creating a single-kernel-forward-smoothed object, wherein the single-kernel-forward smoothed object includes as an entry the smoothed value associated to the first object point.

9. The method of claim 8, wherein smoothing the first tomographic reconstructed object includes:
   based on the pixon kernel function, determining for each of the object points a set of object points;
   for each object point, determining a smoothed value based on the values of the data points within the set of object data points.

10. The method of claim 8, wherein pixon smoothing the first tomographic reconstructed object includes:
    based on a value of the pixon map associated to the first object point, determining a smoothing contribution of the pixon kernel function to the pixon smoothed value associated to the first object point; and
    wherein constructing the first smoothed object includes considering the smoothing contribution.

11. The method of claim 10, wherein the pixon map includes a weight for a combination of pixon kernel function and object point, and wherein constructing the first smoothed object further includes weighting the smoothed value with the weight for that combination of pixon kernel function and object point.

12. The method of claim 6, wherein determining a smoothed value of a first object point includes:
    identifying object points of the first object that are to receive a smoothing contribution from the selected pixon kernel function as indicated in the pixon map;
    determining contribution factors indicative of an extent to which the selected pixon kernel function contributes to the smoothing of the selected object points;

multiplying values of the object points of the first tomographic reconstructed object with corresponding contribution factors thereby creating a temporary object; and smoothing the temporary object with the pixon kernel function thereby creating a single-kernel-backward-smoothed object, wherein the single-kernel-backward-smoothed object includes as an entry the smoothed value associated to the first object point.

13. The method of claim 6, wherein constructing the first smoothed object includes:

for all pixon functions indicated in the pixon map, adding the entries of the single-kernel-backward smoothed objects.

14. The method of claim 1, wherein the first tomographic reconstructed object is reconstructed as a 3D object.

15. The method of claim 1, wherein reconstructing the first tomographic reconstructed object includes running an algorithm selected from the group consisting of algorithms based on maximum likelihood, algorithms based on an ordered subset expectation maximization, algorithms based on a non-negative least square fit, and algorithms based on an ordered subset non-negative least square fit.

16. The method of claim 1, further comprising detecting the data set with a nuclear imaging device.

17. A nuclear imaging device for providing a 3D image object, the device comprising:

a detector unit for detecting radiation emitted from a volume within a patient and providing a data set indicative of the detected radiation in the volume;

a tomographic reconstruction unit configured to reconstruct a first tomographic reconstructed object on the basis of the data set and to provide the first tomographic reconstructed object as an output object;

a 3D pixon smoothing unit configured to receive the first tomographic reconstructed object and to smooth the first tomographic reconstructed object based on a pixon map that assigns pixon kernel functions to object points within a 3D object space, thereby creating a first smoothed object;

an output port for providing the 3D image object; and a control unit for controlling which of the output object and the first smoothed object is provided at the output port as the 3D image object.

18. The nuclear imaging device of claim 17, wherein the reconstruction unit is further configured to receive the first smoothed object as the input object for reconstructing a second tomographic reconstructed object and to provide the second tomographic reconstructed object as the output object.

19. The nuclear imaging device of claim 18, wherein the pixon smoothing unit is configured to receive the second tomographic reconstructed object and to smooth the second tomographic reconstructed object thereby creating a second smoothed object.

20. The nuclear imaging device of claim 17, wherein the detector unit includes a detector system selected from the group consisting of a positron emission tomography detector system, a single photon computed tomography detector system and a computed tomography detector system.

21. A method for tomographic reconstruction of a 3D image object corresponding to a data set, the method comprising:

reconstructing, by a processor, a first tomographic reconstructed object from the data set, the data set being for an imaged volume;

receiving a smoothing pixon map;

based on the smoothing pixon map, 3D pixon smoothing, by the processor, the first tomographic reconstructed object thereby creating a first smoothed object; and outputting the first smoothed object as the 3D image object, wherein the smoothing pixon map assigns pixon kernel functions to object points within a 3D object space.

22. The method of claim 21, wherein smoothing the first tomographic reconstructed object includes:

determining, in a series of iteration steps, single-kernel-smoothed objects, wherein each iteration step is associated with a kernel function associated to the smoothing map and includes:

based on the first tomographic reconstructed object, determining a start object and smoothing the start object using a kernel function of each iteration step, thereby creating a single-kernel-smoothed object having single-kernel-smoothed values associated to each object point; and constructing the first smoothed object from the single-kernel-smoothed values.

23. The method of claim 21, wherein the first smoothed object is used as the start object and wherein determining single-kernel-smoothed objects includes:

receiving contribution factors to the smoothing of the kernel function for each object point; and wherein constructing the smoothed object includes weighting the single-kernel-smoothed values with the contribution factors.

24. The method of claim 21, wherein determining single-kernel-smoothed objects includes:

from the smoothing map, receiving contribution factors to the smoothing of the kernel function for each object point; and wherein determining the start object includes weighting the values of the first object with the contribution factors.

25. A method for smoothing a first object, thereby creating a smoothed object having a smoothed value associated with each object point in object space, the method comprising:

receiving the first object;

determining, by a processor in a series of iteration steps, single-kernel-smoothed objects, wherein each iteration step includes:

based on the first object, determining a start object and 3D smoothing the start object using a kernel function associated with each iteration step, thereby creating a single-kernel-smoothed object having single-kernel-smoothed values associated with each object point; and constructing, by the processor, the smoothed object from the single-kernel-smoothed values.

* * * * *